US010872350B1

(12) United States Patent
Hu et al.

(10) Patent No.: US 10,872,350 B1
(45) Date of Patent: Dec. 22, 2020

(54) SYSTEM AND METHOD FOR OPTIMIZING ONLINE MARKETING BASED UPON RELATIVE ADVERTISEMENT PLACEMENT

(71) Applicant: Overstock.com, Inc., Salt Lake City, UT (US)

(72) Inventors: Yugang Hu, Salt Lake City, UT (US); Seth Moore, Lehi, UT (US); Jp Knab, Riverton, UT (US); Amit Goyal, South Jordan, UT (US)

(73) Assignee: Overstock.com, Inc., Midvale, UT (US)

( * ) Notice: Subject to any disclaimer, the term of this patent is extended or adjusted under 35 U.S.C. 154(b) by 317 days.

(21) Appl. No.: 14/099,795

(22) Filed: Dec. 6, 2013

(51) Int. Cl.
*G06Q 30/02* (2012.01)

(52) U.S. Cl.
CPC .............................. *G06Q 30/0256* (2013.01)

(58) Field of Classification Search
CPC ................................................ G06Q 30/0256
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |

(Continued)

FOREIGN PATENT DOCUMENTS

| | | |
|---|---|---|
| CA | 2253543 | 10/1997 |
| CA | 2347812 | 5/2000 |

(Continued)

OTHER PUBLICATIONS

V. Aksakalli, Optimizing direct response in Internet display advertising, Elsevier, vol. 11, Issue 3, May-Jun. 2012, pp. 229-240. (Year: 2012).*

(Continued)

*Primary Examiner* — William A Brandenburg
*Assistant Examiner* — Christopher C Busch
(74) *Attorney, Agent, or Firm* — Clayton Howarth, P.C.

(57) ABSTRACT

A method for optimizing target content on a search results webpage includes receiving source code defining the webpage from a search engine server. The method further includes processing the source code to identify a target source code block in the source code, the target source code block defining, at least partially, the target content. The method further includes processing the target source code block to determine a relative metric for the target content with respect to a layout of the search results webpage. Thereafter, the relative metric may be utilized to optimize advertising expenditures in order to improve a relative position of the target content.

38 Claims, 6 Drawing Sheets

(56) References Cited

U.S. PATENT DOCUMENTS

| | | |
|---|---|---|
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,377,354 A | 12/1994 | Scannell et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,621,790 A | 4/1997 | Grossman et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,970,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,974,396 A | 10/1999 | Anderson et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,049,797 A | 4/2000 | Guha et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 | 3/2002 | Gershman et al. |
| 6,356,908 B1 | 3/2002 | Brown et al. |
| 6,366,899 B1 | 4/2002 | Kernz |
| 6,370,527 B1 | 4/2002 | Singhai |
| 6,373,933 B1 | 4/2002 | Sarkki et al. |
| 6,374,260 B1 | 4/2002 | Hoffert et al. |
| 6,381,410 B1 | 4/2002 | Amidhozour et al. |
| 6,415,270 B1 | 7/2002 | Rackson et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,675,178 B1 | 1/2004 | Chinchar |
| 6,694,436 B1 | 2/2004 | Audebert |
| 6,701,310 B1 | 3/2004 | Sugiura et al. |
| 6,718,536 B2 | 4/2004 | Dupaquis |
| 6,725,268 B1 | 4/2004 | Jackel et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,801,909 B2 | 10/2004 | Delgado et al. |
| 6,856,963 B1 | 2/2005 | Hurwitz |
| 6,889,054 B2 | 5/2005 | Himmel et al. |

(56) References Cited

U.S. PATENT DOCUMENTS

| | | |
|---|---|---|
| 6,907,401 B1 | 6/2005 | Vittal et al. |
| 6,912,505 B2 | 6/2005 | Linden et al. |
| 6,978,273 B1 | 12/2005 | Bonneau et al. |
| 7,043,450 B2 | 5/2006 | Velez et al. |
| 7,069,242 B1 | 6/2006 | Sheth et al. |
| 7,076,453 B2 | 7/2006 | Jammes et al. |
| 7,076,504 B1 | 7/2006 | Handel et al. |
| 7,080,030 B2 | 7/2006 | Elgen et al. |
| 7,100,111 B2 | 8/2006 | McElfresh et al. |
| 7,100,195 B1 | 8/2006 | Underwood |
| 7,117,207 B1 | 10/2006 | Kerschberg et al. |
| 7,127,416 B1 | 10/2006 | Tenorio |
| 7,165,091 B1 | 1/2007 | Lunenfeld |
| 7,167,910 B2 | 1/2007 | Farnham et al. |
| 7,216,115 B1 | 5/2007 | Walters et al. |
| 7,240,016 B1 | 7/2007 | Sturgis |
| 7,254,547 B1 | 8/2007 | Beck et al. |
| 7,318,037 B2 | 1/2008 | Solari |
| 7,324,966 B2 | 1/2008 | Scheer |
| 7,340,249 B2 | 3/2008 | Moran et al. |
| 7,349,668 B2 | 3/2008 | Ilan et al. |
| 7,353,188 B2 | 4/2008 | Yim et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,383,320 B1 | 6/2008 | Silberstein et al. |
| 7,401,025 B1 | 7/2008 | Lokitz |
| 7,447,646 B1 | 11/2008 | Agarwal et al. |
| 7,451,476 B1 | 11/2008 | Banks |
| 7,454,464 B2 | 11/2008 | Puthenkulam et al. |
| 7,457,730 B2 | 11/2008 | Degnan |
| 7,493,521 B1 | 2/2009 | Li et al. |
| 7,496,525 B1 | 2/2009 | Mitchell |
| 7,496,527 B2 | 2/2009 | Silverstein et al. |
| 7,496,582 B2 | 2/2009 | Farnham et al. |
| 7,516,094 B2 | 4/2009 | Perkowski |
| 7,539,696 B1 | 5/2009 | Greener et al. |
| 7,546,625 B1 | 6/2009 | Kamangar |
| 7,552,067 B2 | 6/2009 | Nephew et al. |
| 7,565,615 B2 | 7/2009 | Ebert |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,834,883 B2 | 11/2010 | Adams |
| 7,904,348 B2 | 3/2011 | Johnson et al. |
| 7,912,748 B1 | 3/2011 | Rosenberg et al. |
| 7,921,031 B2 | 4/2011 | Crysel |
| 7,941,751 B2 | 5/2011 | Ebert |
| 7,979,340 B2 | 7/2011 | MacDonald Korth et al. |
| 7,983,950 B2 | 7/2011 | DeVita |
| 7,983,963 B2 | 7/2011 | Byrne et al. |
| 8,086,643 B1 | 12/2011 | Tenorio |
| 8,112,303 B2 | 2/2012 | Eglen et al. |
| 8,140,989 B2 | 3/2012 | Cohen et al. |
| 8,204,799 B1 | 6/2012 | Murray et al. |
| 8,214,264 B2 | 7/2012 | Kasavin et al. |
| 8,214,804 B2 | 7/2012 | Robertson |
| 8,260,852 B1 | 9/2012 | Cselle |
| 8,312,056 B1 | 11/2012 | Peng et al. |
| 8,326,662 B1 | 12/2012 | Byrne et al. |
| 8,370,269 B2 | 2/2013 | MacDonald-Korth et al. |
| 8,370,425 B2 | 2/2013 | Bonefas |
| 8,452,691 B2 | 5/2013 | MacDonald Korth et al. |
| 8,473,316 B1 | 6/2013 | Panzitta et al. |
| 8,494,912 B2 | 7/2013 | Fraser et al. |
| 8,545,265 B2 | 10/2013 | Sakamoto et al. |
| 8,577,740 B1 | 11/2013 | Murray et al. |
| 8,583,480 B2 | 11/2013 | Byrne |
| 8,630,960 B2 | 1/2014 | Gross |
| 8,676,632 B1 | 3/2014 | Watson et al. |
| 8,693,494 B2 | 4/2014 | Fiatal |
| 8,719,075 B2 | 5/2014 | MacDonald Korth et al. |
| 8,793,650 B2 | 7/2014 | Hilerio et al. |
| 9,047,341 B2 | 6/2015 | Pan |
| 9,047,642 B2 | 6/2015 | Byrne et al. |
| 9,448,692 B1 | 9/2016 | Mierau |
| 9,483,788 B2 | 11/2016 | Martin |
| 9,741,080 B1 | 8/2017 | Byrne |
| 9,747,622 B1 | 8/2017 | Johnson et al. |
| 9,805,425 B2 | 10/2017 | MacDonald-Korth et al. |
| 9,928,752 B2 | 3/2018 | Byrne et al. |
| 9,940,659 B1 | 4/2018 | Behbahani et al. |
| 10,074,118 B1 | 9/2018 | Johnson et al. |
| 10,102,287 B2 | 10/2018 | Martin |
| 10,269,081 B1 | 4/2019 | Byrne |
| 10,423,997 B2 | 9/2019 | MacDonald Korth et al. |
| 2001/0014868 A1 | 8/2001 | Herz et al. |
| 2001/0034667 A1 | 10/2001 | Petersen |
| 2001/0034668 A1 | 10/2001 | Whitworth |
| 2001/0044751 A1 | 11/2001 | Pugliese et al. |
| 2001/0047290 A1 | 11/2001 | Petras et al. |
| 2001/0047308 A1 | 11/2001 | Kaminsky et al. |
| 2001/0051996 A1 | 12/2001 | Cooper et al. |
| 2002/0002513 A1 | 1/2002 | Chiasson |
| 2002/0007356 A1 | 1/2002 | Rice et al. |
| 2002/0013721 A1 | 1/2002 | Capel et al. |
| 2002/0019763 A1 | 2/2002 | Linden |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0038312 A1 | 3/2002 | Donner et al. |
| 2002/0040352 A1 | 4/2002 | McCormick |
| 2002/0042738 A1 | 4/2002 | Srinivasan et al. |
| 2002/0049622 A1 | 4/2002 | Lettich |
| 2002/0056044 A1 | 5/2002 | Andersson |
| 2002/0099578 A1 | 7/2002 | Eicher et al. |
| 2002/0099579 A1 | 7/2002 | Scelzo et al. |
| 2002/0099602 A1 | 7/2002 | Moskowitz et al. |
| 2002/0107718 A1 | 8/2002 | Morrill et al. |
| 2002/0107853 A1 | 8/2002 | Hofmann et al. |
| 2002/0111826 A1 | 8/2002 | Potter |
| 2002/0120537 A1 | 8/2002 | Morea et al. |
| 2002/0123957 A1 | 9/2002 | Notarius et al. |
| 2002/0124100 A1 | 9/2002 | Adams |
| 2002/0129282 A1 | 9/2002 | Hopkins |
| 2002/0133502 A1 | 9/2002 | Rosenthal |
| 2002/0138399 A1 | 9/2002 | Hayes et al. |
| 2002/0147625 A1 | 10/2002 | Kolke |
| 2002/0156802 A1 | 10/2002 | Takayama et al. |
| 2002/0161648 A1 | 10/2002 | Mason et al. |
| 2002/0188777 A1 | 12/2002 | Kraft et al. |
| 2002/0194049 A1 | 12/2002 | Boyd |
| 2002/0198784 A1 | 12/2002 | Shaak et al. |
| 2002/0198882 A1 | 12/2002 | Linden et al. |
| 2003/0004855 A1 | 1/2003 | Dutta et al. |
| 2003/0005046 A1 | 1/2003 | Kavanagh et al. |
| 2003/0009362 A1 | 1/2003 | Cifani et al. |
| 2003/0009392 A1 | 1/2003 | Perkowski |
| 2003/0014400 A1 | 1/2003 | Siegel |
| 2003/0028605 A1 | 2/2003 | Millett et al. |
| 2003/0032409 A1 | 2/2003 | Hutcheson et al. |
| 2003/0035138 A1 | 2/2003 | Schilling |
| 2003/0036914 A1 | 2/2003 | Fitzpatrick et al. |
| 2003/0040970 A1 | 2/2003 | Miller |
| 2003/0041008 A1 | 2/2003 | Grey et al. |
| 2003/0046149 A1 | 3/2003 | Wong |
| 2003/0069740 A1 | 4/2003 | Zeidman |
| 2003/0069790 A1 | 4/2003 | Kane |
| 2003/0069825 A1 | 4/2003 | Burk et al. |
| 2003/0088467 A1 | 5/2003 | Culver |
| 2003/0088511 A1 | 5/2003 | Karboulonis et al. |
| 2003/0093331 A1 | 5/2003 | Childs et al. |
| 2003/0097352 A1 | 5/2003 | Gutta et al. |
| 2003/0105682 A1 | 6/2003 | Dicker et al. |
| 2003/0110100 A1 | 6/2003 | Wirth, Jr. |
| 2003/0119492 A1 | 6/2003 | Timmins et al. |
| 2003/0083961 A1 | 7/2003 | Bezos et al. |
| 2003/0131095 A1 | 7/2003 | Kumhyr et al. |
| 2003/0139969 A1 | 7/2003 | Scroggie et al. |
| 2003/0140007 A1 | 7/2003 | Kramer |
| 2003/0140121 A1 | 7/2003 | Adams |
| 2003/0158792 A1 | 8/2003 | Perkowski |
| 2003/0163340 A1 | 8/2003 | Fitzpatrick et al. |

(56) References Cited

U.S. PATENT DOCUMENTS

| | | |
|---|---|---|
| 2003/0167213 A1 | 9/2003 | Jammes et al. |
| 2003/0167222 A1 | 9/2003 | Mehrotra et al. |
| 2003/0177103 A1 | 9/2003 | Ivanov et al. |
| 2003/0187745 A1 | 10/2003 | Hobday et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2004/0006509 A1 | 1/2004 | Mannik et al. |
| 2004/0015416 A1 | 1/2004 | Foster et al. |
| 2004/0029567 A1 | 2/2004 | Timmins et al. |
| 2004/0041836 A1 | 3/2004 | Zaner et al. |
| 2004/0044563 A1 | 3/2004 | Stein |
| 2004/0055017 A1 | 3/2004 | Delpuch et al. |
| 2004/0058710 A1 | 3/2004 | Timmins et al. |
| 2004/0073476 A1 | 4/2004 | Donahue et al. |
| 2004/0078388 A1 | 4/2004 | Melman |
| 2004/0107136 A1 | 6/2004 | Nemirofsky et al. |
| 2004/0117242 A1 | 6/2004 | Conrad et al. |
| 2004/0122083 A1 | 6/2004 | Lippert et al. |
| 2004/0122681 A1 | 6/2004 | Ruvolo et al. |
| 2004/0122735 A1 | 6/2004 | Meshkin |
| 2004/0122855 A1 | 6/2004 | Ruvolo et al. |
| 2004/0128183 A1 | 7/2004 | Challey et al. |
| 2004/0128283 A1 | 7/2004 | Wang |
| 2004/0128320 A1 | 7/2004 | Grove et al. |
| 2004/0143731 A1 | 7/2004 | Audebert |
| 2004/0148232 A1 | 7/2004 | Fushimi et al. |
| 2004/0172323 A1 | 9/2004 | Stamm |
| 2004/0172379 A1 | 9/2004 | Mott et al. |
| 2004/0174979 A1 | 9/2004 | Hutton et al. |
| 2004/0186766 A1 | 9/2004 | Fellenstein et al. |
| 2004/0199496 A1 | 10/2004 | Liu et al. |
| 2004/0199905 A1 | 10/2004 | Fagin et al. |
| 2004/0204989 A1 | 10/2004 | Dicker |
| 2004/0204991 A1 | 10/2004 | Monahan et al. |
| 2004/0230989 A1 | 11/2004 | Macey |
| 2004/0240642 A1 | 12/2004 | Crandell et al. |
| 2004/0249727 A1 | 12/2004 | Cook, Jr. et al. |
| 2004/0267717 A1 | 12/2004 | Slackman |
| 2005/0010925 A1 | 1/2005 | Khawand et al. |
| 2005/0021666 A1 | 1/2005 | Dinnage et al. |
| 2005/0038733 A1 | 2/2005 | Foster et al. |
| 2005/0044254 A1 | 2/2005 | Smith |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1 | 5/2005 | Ackley et al. |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 | 9/2005 | Allen et al. |
| 2005/0203888 A1 | 9/2005 | Woolsey et al. |
| 2005/0216300 A1 | 9/2005 | Appelman et al. |
| 2005/0262067 A1 | 11/2005 | Lee et al. |
| 2005/0273378 A1 | 12/2005 | MacDonald-Korth et al. |
| 2006/0009994 A1 | 1/2006 | Hogg et al. |
| 2006/0010105 A1 | 1/2006 | Sarukkai et al. |
| 2006/0015498 A1 | 1/2006 | Sarmiento |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0173817 A1 | 8/2006 | Chowdhury et al. |
| 2006/0206479 A1 | 9/2006 | Mason |
| 2006/0230035 A1 | 10/2006 | Bailey et al. |
| 2006/0235752 A1 | 10/2006 | Kavanagh et al. |
| 2006/0259360 A1 | 11/2006 | Flinn et al. |
| 2006/0271671 A1 | 11/2006 | Hansen |
| 2006/0282304 A1 | 11/2006 | Hansen |
| 2007/0005424 A1 | 1/2007 | Arauz |
| 2007/0027760 A1 | 2/2007 | Collins et al. |
| 2007/0027814 A1 | 2/2007 | Tuoriniemi |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0078849 A1 | 4/2007 | Slothouber |
| 2007/0083437 A1 | 4/2007 | Hamor |
| 2007/0094597 A1 | 4/2007 | Rostom |
| 2007/0100803 A1 | 5/2007 | Cava |
| 2007/0160345 A1 | 7/2007 | Sakai et al. |
| 2007/0162379 A1 | 7/2007 | Skinner |
| 2007/0174108 A1 | 7/2007 | Monster |
| 2007/0192168 A1 | 8/2007 | Van Luchene |
| 2007/0192181 A1 | 8/2007 | Asdourian |
| 2007/0206606 A1 | 9/2007 | Coleman et al. |
| 2007/0214048 A1 | 9/2007 | Chan et al. |
| 2007/0226679 A1 | 9/2007 | Jayamohan et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2007/0288298 A1 | 12/2007 | Gutierrez |
| 2007/0299743 A1 | 12/2007 | Staib et al. |
| 2008/0015938 A1 | 1/2008 | Haddad et al. |
| 2008/0021763 A1 | 1/2008 | Merchant |
| 2008/0052152 A1 | 2/2008 | Yufik |
| 2008/0071640 A1 | 3/2008 | Nguyen |
| 2008/0082394 A1 | 4/2008 | Floyd et al. |
| 2008/0103893 A1* | 5/2008 | Nagarajan .............. G06Q 30/02 705/14.41 |
| 2008/0120342 A1 | 5/2008 | Reed |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0140765 A1 | 6/2008 | Kelaita et al. |
| 2008/0162574 A1 | 7/2008 | Gilbert |
| 2008/0201218 A1 | 8/2008 | Broder et al. |
| 2008/0215456 A1 | 9/2008 | West et al. |
| 2008/0288338 A1 | 11/2008 | Wiseman et al. |
| 2008/0294536 A1 | 11/2008 | Taylor et al. |
| 2008/0300909 A1 | 12/2008 | Rikhtverchik et al. |
| 2008/0301009 A1 | 12/2008 | Plaster et al. |
| 2008/0305869 A1 | 12/2008 | Konforty |
| 2008/0313010 A1 | 12/2008 | Jepson |
| 2009/0006190 A1 | 1/2009 | Lucash et al. |
| 2009/0030755 A1 | 1/2009 | Altberg et al. |
| 2009/0030775 A1 | 1/2009 | Vieri |
| 2009/0106080 A1 | 4/2009 | Carrier et al. |
| 2009/0106127 A1 | 4/2009 | Purdy et al. |
| 2009/0110181 A1 | 4/2009 | Koenig |
| 2009/0119167 A1 | 5/2009 | Kendall et al. |
| 2009/0157537 A1 | 6/2009 | Miller |
| 2009/0164323 A1 | 6/2009 | Byrne |
| 2009/0182589 A1 | 7/2009 | Kendall et al. |
| 2009/0204848 A1 | 8/2009 | Kube et al. |
| 2009/0222348 A1 | 9/2009 | Ransom et al. |
| 2009/0222737 A1 | 9/2009 | Liesche |
| 2009/0234722 A1 | 9/2009 | Evevsky |
| 2009/0240582 A1 | 9/2009 | Sheldon-Neal et al. |
| 2009/0276284 A1 | 11/2009 | Yost |
| 2009/0276305 A1 | 11/2009 | Clopp |
| 2009/0292677 A1 | 11/2009 | Kim |
| 2009/0293019 A1 | 11/2009 | Raffel et al. |
| 2009/0313173 A1 | 12/2009 | Singh |
| 2010/0042684 A1 | 2/2010 | Broms et al. |
| 2010/0070448 A1 | 3/2010 | Omoigui |
| 2010/0076816 A1 | 3/2010 | Phillips |
| 2010/0076851 A1 | 3/2010 | Jewell, Jr. |
| 2010/0094673 A1 | 4/2010 | Lobo et al. |
| 2010/0107123 A1 | 4/2010 | Sareen |
| 2010/0145831 A1 | 6/2010 | Esfandiari et al. |
| 2010/0146413 A1* | 6/2010 | Yu .................. G06F 16/9577 715/760 |
| 2010/0228617 A1 | 9/2010 | Ransom et al. |
| 2011/0010656 A1 | 1/2011 | Mokotov |
| 2011/0055054 A1* | 3/2011 | Glasson .............. G06Q 30/06 705/27.2 |
| 2011/0060621 A1 | 3/2011 | Weller et al. |

(56) References Cited

U.S. PATENT DOCUMENTS

| | | |
|---|---|---|
| 2011/0103699 A1 | 5/2011 | Ke et al. |
| 2011/0153383 A1 | 6/2011 | Bhattacharjya et al. |
| 2011/0153663 A1 | 6/2011 | Koren et al. |
| 2011/0173076 A1 | 7/2011 | Eggleston |
| 2011/0196802 A1 | 8/2011 | Ellis et al. |
| 2011/0225050 A1 | 9/2011 | Varghese |
| 2011/0231226 A1 | 9/2011 | Golden |
| 2011/0231383 A1 | 9/2011 | Smyth et al. |
| 2011/0258049 A1 | 10/2011 | Ramer et al. |
| 2011/0271204 A1 | 11/2011 | Jones et al. |
| 2011/0276513 A1 | 11/2011 | Erhart et al. |
| 2011/0289068 A1 | 11/2011 | Teevan et al. |
| 2012/0005187 A1 | 1/2012 | Chavanne |
| 2012/0030067 A1 | 2/2012 | Pothukuchi et al. |
| 2012/0084135 A1 | 4/2012 | Nissan et al. |
| 2012/0158715 A1 | 6/2012 | Mahoul et al. |
| 2012/0164619 A1 | 6/2012 | Meer |
| 2012/0166299 A1 | 6/2012 | Heinstein |
| 2012/0231424 A1 | 9/2012 | Calman et al. |
| 2012/0278388 A1 | 11/2012 | Kleinbart et al. |
| 2012/0284336 A1 | 11/2012 | Schmidt et al. |
| 2013/0073392 A1 | 3/2013 | Allen et al. |
| 2013/0080200 A1 | 3/2013 | Connolly et al. |
| 2013/0080426 A1 | 3/2013 | Chen et al. |
| 2013/0085893 A1 | 4/2013 | Bhardwaj et al. |
| 2013/0144870 A1 | 6/2013 | Gupta et al. |
| 2013/0145254 A1* | 6/2013 | Masuko ............ G06F 17/2247 715/234 |
| 2013/0151331 A1* | 6/2013 | Avner ............... G06Q 30/0244 705/14.41 |
| 2013/0151388 A1 | 6/2013 | Falkenborg |
| 2013/0185164 A1* | 7/2013 | Pottjegort ............ G06Q 30/02 705/14.73 |
| 2013/0191409 A1 | 7/2013 | Zeng |
| 2013/0254059 A1 | 9/2013 | Teo |
| 2013/0268561 A1 | 10/2013 | Christie et al. |
| 2014/0019313 A1 | 1/2014 | Hu et al. |
| 2014/0025509 A1* | 1/2014 | Reisz ................. G06Q 30/0275 705/14.71 |
| 2014/0032544 A1 | 1/2014 | Mathieu et al. |
| 2014/0114680 A1 | 4/2014 | Mills et al. |
| 2014/0136290 A1 | 5/2014 | Schiestl et al. |
| 2014/0172652 A1 | 6/2014 | Pobbathi et al. |
| 2014/0188075 A1 | 6/2014 | Agarwal |
| 2014/0200959 A1 | 7/2014 | Sarb et al. |
| 2014/0259056 A1* | 9/2014 | Grusd ................ H04N 21/8583 725/34 |
| 2014/0289005 A1 | 9/2014 | Laing et al. |
| 2014/0337090 A1 | 11/2014 | Tavares |
| 2015/0287066 A1 | 10/2015 | Wortley et al. |
| 2017/0344622 A1 | 11/2017 | Islam et al. |

FOREIGN PATENT DOCUMENTS

| | | |
|---|---|---|
| EP | 0636993 | 4/1999 |
| EP | 0807891 | 5/2000 |
| EP | 1241603 | 3/2001 |
| GB | 2397400 | 7/2004 |
| GB | 2424098 | 9/2006 |
| JP | 2001283083 | 10/2001 |
| JP | 2002318935 | 10/2002 |
| JP | 2009505238 | 2/2009 |
| WO | 97/17663 | 5/1997 |
| WO | 98/32289 | 7/1998 |
| WO | 98/47082 | 10/1998 |
| WO | WO9849641 | 11/1998 |
| WO | 99/59283 | 11/1999 |
| WO | 00/25218 | 5/2000 |
| WO | WO0109803 | 2/2001 |
| WO | WO0182135 | 11/2001 |
| WO | WO200197099 | 12/2001 |
| WO | WO200237234 | 11/2002 |
| WO | WO2003094080 | 11/2003 |
| WO | 2007021920 | 2/2007 |
| WO | WO2007021920 | 2/2007 |
| WO | WO2012093410 | 7/2012 |
| WO | WO2015116038 | 8/2015 |
| WO | WO2015176071 | 11/2015 |

OTHER PUBLICATIONS

Ball et al., "Supply chain infrastructures: system integration and information sharing," ACM SIGMOD Record, 2002, vol. 31, No. 1, pp. 61-66.

Joshi, "Information visibility and its effect on supply chain dynamics," Ph.D. dissertation, Massachusetts Institute of Technology, 2000 (fig. 4.5; p. 45).

"Mediappraise: Mediappraise Receives National Award for Web-Based Technology That Enables Companies to Solve Thorny HR Problem," Dec. 14, 1998.

Medvinsky et al., "Electronic Currency for the Internet," Electronic Markets—The International Journal, Oct. 1993, 2 pages, vol. 3, No. 3.

metails.com, www.metails.com homepage, printed Oct. 13, 2004.

Microsoft Computer Dictionary, Fifth Edition, front matter and p. 33.

Microsoft Computer Dictionary, Fifth Edition, front matter, back matter, and pp. 479, 486.

Neches, "FAST—A Research Project in Electronic Commerce," Electronic Markets—The International Journal, Oct. 1993, 4 pages, vol. 3, No. 3.

Neo, "The implementation of an electronic market for pig trading in Singapore," Journal of Strategic Information Systems, Dec. 1992, pp. 278-288, vol. 1, No. 5.

O'Mahony, "An X.500-based Product Catalogue," Electronic Markets—The International Journal, Oct. 1993, 2 pages, vol. 3, No. 3.

"ONSALE: ONSALE Brings Thrill of Auctions and Bargain Hunting Online: Unique Internet retail services debuts with week-long charity auction for The Computer Museum in Boston," May 24, 1995, printed from www.dialogweb.com/cgi/dwclient?dwcommand,DWEBPRINT%20810-489267.

"ONSALE joins fray as online shopping picks up speed: Internet Booms," Computer Reseller News, Jun. 5, 1995.

Palm, Inc. Palm™ Web Pro Handbook, copyright 2002-2003.

Post et al., "Application of Auctions as a Pricing Mechanism for the Interchange of Electric Power," IEEE Transactions of Power Systems, Aug. 1995, pp. 1580-1584, vol. 10, No. 3.

Preist et al., "Adaptive agents in a persistent shout double auction," International Conference on Information and Computation, Proceedings of the first international conference on information and computation economies, Oct. 25-28, 1998, Charleston, United States, pp. 11-18.

Qualcomm, "Brew Developer Support," printed from web.archive.org/web/20020209194207/http:/www.qualcomm.com/brew/developer/support/kb/52.html on Aug. 30, 2007.

RCR Wireless News, "Lockheed Martin to use 2Roam's technology for wireless platform," RCR Wireless News, Sep. 10, 2001.

Reck, "Formally Specifying an Automated Trade Execution System," J. Systems Software, 1993, pp. 245-252, vol. 21.

Reck, "Trading-Process Characteristics of Electronic Auctions," Electronic Markets—The International Journal, Dec. 1997, pp. 17-23, vol. 7, No. 4.

repcheck.com, www.repcheck.com homepage, printed from web.archive.org/web/20020330183132/http://repcheck.com on Sep. 5, 2009.

Resnick et al., "Reputation Systems," Communications of the ACM, Dec. 2000, pp. 45-48, vol. 43, No. 12.

Rockoff et al., "Design of an Internet-based system for remote Dutch auctions," Internet Research: Electronic Networking Applications and Policy, 1995, pp. 10-16, vol. 5, No. 4.

Rose, "Vendors strive to undo Adobe lock-hold," Computer Reseller News, Feb. 5, 1996, n 66669, p. 71(7).

Rysavy, "Mobile-commerce ASPs do the legwork," Network Computing, Jan. 22, 2001, p. 71, 6 pgs., vol. 12, No. 2.

Saunders, "AdFlight to Offer WAP Ads," Oct. 17, 2000, printed from clickz.com/487531/print.

(56) References Cited

OTHER PUBLICATIONS

Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Şen, "Inventory and Pricing Models for Perishable Products," Doctor of Philosophy Dissertation—University of Southern California, Aug. 2000.
Siegmann, "Nowhere to go but up," PC Week, Oct. 23, 1995, 3 pages, vol. 12, No. 42.
Telephony Staff, "Air-ASP," Telephone Online, Oct. 2, 2000, 3 pages.
Teo, "Organizational Factors of Success in Using EDIS: A Survey of Tradenet Participants," Electronic Markets—The International Journal, Oct. 1993, 2 pages, vol. 3, No. 3.
Tjostheim et al., "A case study of an on-line auction for the World Wide Web," printed from www.nr.no/gem/elcom/puplikasjoner/enter98e.html on Jun. 10, 1999, 10 pages.
Turban, "Auctions and Bidding on the Internet: An Assessment," Electronic Markets—The International Journal, Dec. 1997, 5 pages, vol. 7, No. 4.
ubid.com, "How do I Update my Address, Phone, Credit Card, Password, etc.?" printed from web.archive.org/web/20010208113903/www.ubid.com/help/topic13asp on Aug. 30, 2007.
ubid.com, "How do I track my shipment?" printed from web.archive.org/web/20010331032659/www.ubid.com/help/topic27.asp on Aug. 30, 2007.
ubid.com, "Can I track all of my bids from My Page?" pritned from web.archive.org/web/20010208114049/www.ubid.com/help/topic14.asp on Aug. 30, 2007.
Van Heck et al., "Experiences with Electronic Auctions in the Dutch Flower Industry," Electronic Markets—The International Journal, Dec. 1997, 6 pages, vol. 7, No. 4.
Verizon Wireless, "Verizon Wireless Customers Get It NowSM; Get Games, Get Pix, Get Ring Tones and Get Going in Full Color," press release to PRNewswire, Sep. 23, 2002.
Warbelow et al., "AUCNET: TV Auction Network System," Harvard Business School 9-190-001, Jul. 19, 1989, Rev. Apr. 12, 1996, pp. 1-15.
Weber, "How Financial Markets are Going On-line," Electronic Markets—The International Journal, Oct. 1993, 2 pages, vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on BREW Agenda," Wireless Week, Sep. 23, 2002.
xchanger.net, webpage printed from www.auctiva.com/showcases/as_4sale.asp?uid=exchanger, undated but at least as early as Oct. 12, 2000.
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.
Zimmermann, "Integration of Financial Services: The TeleCounter," Electronic Markets—The International Journal, Oct. 1993, 1 page, vol. 3, No. 3.
Zwass, "Electronic Commerce: Structures and Issues," International Journal of Electronic Commerce, Fall 1996, pp. 3-23, vol. 1, No. 1.
2ROAM, Inc., multiple archived pages of www.2roam.com retrieved via Internet Archive Wayback Machine on Jun. 10, 2008.
Alt et al., "Bibliography on Electronic Commerce," Electronic Markets—The International Journal, Oct. 1993, 5 pages, vol. 3, No. 3.
Alt et al., "Computer Integrated Logistics," Electronic Markets—The International Journal, Oct. 1993, 1 page, vol. 3, No. 3.

Anonymous, Image manipulation (image-editing software and image-manipulation systems)(Seybold Special Report, Part II), Seybold Report on Publishing Systems, May 15, 1995, p. S35(9), vol. 24, No. 18.
auctionwatch.com, multiple pages—including search results for "expedition," printed Apr. 21, 2011.
auctiva.com, multiple pages, undated but website copyright date is "1999-2000."
Berger et al., "Random Multiple-Access Communication and Group Testing," IEEE, 1984.
Braganza, "Is Research at Cranfield—A Look at the Future," Electronic Markets—The International Journal, Oct. 1993, 1 page, vol. 3, No. 3.
Brecht et al., "The IM 2000 Research Programme," Electronic Markets—The International Journal, Oct. 1993, 1 page, vol. 3, No. 3.
Business Wire business/technology editors, "Sellers Flock to OutletZoo.com as New Automatic Price Drop Method Moves Excess Inventory Online," Business Wire, Oct. 25, 1999.
Business Wire business editors/high-tech writers, "PictureWorks Technology, Inc. Expands in Real Estate Market with Adoption of Rimfire on REALTOR.com," Business Wire, Nov. 8, 1999.
Business Wire business editors/high-tech writers, "PictureWorks Technology, Inc. Shows Strong Revenue Growth in Internet Imaging Business," Business Wire, Nov. 10, 1999.
Business Wire business editors/high-tech writers, "2Roam Partners with Pumatech to Delivery Wireless Alerts," Business Wire, Dec. 18, 2000.
Business Wire business editors/high-tech writers, "2Roam Takes eHow's How-to Solutions Wireless: With 2Roam, the Web's One-Stop Source for Getting Things Done is on More Wireless Devices, with Ability to Purchase Its Products from Anywhere," Business Wire, Oct. 2, 2000.
Business Wire business editors/high-tech writers, "2Roam Drives Hertz to the Wireless Web; Number One Car Rental Company to Provide Customers Wireless Access from Any Device," Business Wire, Aug. 7, 2001.
buy.com, www.buy.com homepage, printed Oct. 13, 2004.
Chen et al., "Detecting Web Page Structure for Adaptive Viewing on Small Form Factor Devices," ACM, May 20-24, 2003.
Clarke, "Research Programme in Supra-organizational Systems," Electronic Markets—The International Journal, Oct. 1993, 2 pages, vol. 3, No. 3.
Clemons et al., "Evaluating the prospects for alternative electronic securities markets," Proceedings of the twelfth international conference on information systems, New York, New York, United States, pp. 53-64, 1991.
friendster.com, homepage and "more info" pages, printed Apr. 29, 2004.
Google News archive search for "2Roam marketing" performed over the date range 2000-2003.
Google News archive search for "2Roam SMS" performed over the date range 2000-2008.
Grabowski et al., "Mobile-enabled grid middleware and/or grid gateways," GridLab—A Grid Application Toolkit and Testbed, Work Package 12—Access for Mobile Users, Jun. 3, 2003.
Graham, "The Emergence of Linked Fish Markets in Europe," Electronic Markets—The International Journal, Jul. 1998, 4 pages, vol. 8, No. 2.
Gunthorpe et al., "Portfolio Composition and the Investment Horizon," Financial Analysts Journal, Jan.-Feb. 1994, pp. 51-56.
Halperin, "Toward a Process Handbook for Organizational Coordination Processes," Electronic Markets—The International Journal, Oct. 1993, 1 page, vol. 3, No. 3.
Hess et al., "Computerized Loan Origination Systems: An Industry Case Study of the Electronic Markets Hypothesis," MIS Quarterly, Sep. 1994, pp. 251-275.
IBM, "Anonymous Delivery of Goods in Electronic Commerce," IBM Technical Disclosure Bulletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.

(56) References Cited

OTHER PUBLICATIONS

ICROSSING, "ICROSSING Search Synergy: Natural & Paid Search Symbiosis," Mar. 2007.

IEEE 100—The Authoritative Dictionary of IEEE Standard Terms, Seventh Edition, 2000. Entire book cited; table of contents, source list, and terms beginning with A included. ISBN 0-7381-2601-2.

Ives et al., "Editor's Comments—MISQ Central: Creating a New Intellectual Infrastructure," MIS Quarterly, Sep. 1994, p. xxxv.

Klein, "Information Logistics," Electronic Markets—The International Journal, Oct. 1993, pp. 11-12, vol. 3, No. 3.

Klein, "Introduction to Electronic Auctions," Electronic Markets—The International Journal, Dec. 1997, 4 pages, vol. 7, No. 4.

Kubicek, "The Organization Gap," Electronic Markets—The International Journal, Oct. 1993, 1 page, vol. 3, No. 3.

Kuula, "Telematic Services in Finland," Electronic Markets—The International Journal, Oct. 1993, 1 page, vol. 3, No. 3.

Lalonde, "The EDI World Institute: An International Approach," Electronic Markets—The International Journal, Oct. 1993, 1 page, vol. 3, No. 3.

Lee et al., "Intelligent Electronic Trading for Commodity Exchanges," Electronic Markets—The International Journal, Oct. 1993, 2 pages, vol. 3, No. 3.

Lee et al., "Electronic Brokerage and Electronic Auction: The Impact of IT on Market Structures," Proceedings of the 29th Annual Hawaii International Conference on System Sciences, 1996, pp. 397-406.

Lee, "AUCNET: Electronic Intermediary for Used-Car Transactions," Electronic Market—The International Journal, Dec. 1997, pp. 24-28, vol. 7, No. 4.

LIVE365 press release, "Live365 to Offer Opt-In Advertising on Its Website," Oct. 15, 2004.

London Business School, "Overture and Google: Internet Pay-Per-Click (PPC) Advertising Options," Mar. 2003.

M2 Presswire, "Palm, Inc.: Palm unveils new web browser optimised for handhelds; HTML browser offers highspeed web-browsing option," Mar. 13, 2002.

Malone et al., "Electronic Markets and Electronic Hierarchies," Communications of the ACM, Jun. 1987, pp. 484-497, vol. 30, No. 6.

Mansell et al., "Electronic Trading Networks: The Route to Competitive Advantage?" Electronic Markets—The International Journal, Oct. 1993, 1 page, vol. 3, No. 3.

Mardesich, "Onsale takes auction gavel electronic," Computer Reseller News, Jul. 8, 1996, pp. 2, 32.

Marteau, "Shop with One Click, Anywhere, Anytime," Information Management and Consulting, 2000, pp. 44-46, vol. 15, No. 4.

Massimb et al., "Electronic Trading, Market Structure and Liquidity," Financial Analysts Journal, Jan.-Feb. 1994, pp. 39-49.

McGinity, "Build Your Weapon," PC Magazine, Apr. 24, 2011, printed from www.pcmag.com/print_article2?0,1217,a%253D3955,00. asp.

Meade, "Visual 360: a performance appraisal system that's 'fun,'" HR Magazine, 44, 7, 118(3), Jul. 1999.

Chen, M. (2007), Knowledge assisted data management and retrieval in multimedia database systems (Order No. 3268643).

Fan, J., Keim, F.A., Gao, Y., Luo, H. and Li, Z. (2009). JustClick: Personalized Image Recommendation via Exploratory Search from Large-Scale Flickr Images. Feb. 2009. IEEE Transactions on Circuits and Systems for Video.

Rodriguez, Camille, HootSuite vs. social Oomph vs. Tweekdeck, Jan. 4, 2012, http://polkadotimpressions.com/2012/01/04/hootsuite-vs-social-oopmphys.tweetdeck/ (Year: 2012).

Schaffer, Neil, The Top 20 Twitter clients—HootSuite, TweetDeck and More, Jan. 31, 2012, https://maximizesocialbusinss.com/top-20-twitter-clients-2012-9175/ (Year: 2012).

Y.K. Choi and S. K. Kim, "An auxiliary reccomendation system for repetitively purchasing items in E-commerce," 2014 International Conference on Big Data and Smart Computing (BIGCOMP), Bangkok, 2014, pp. 96-98. (Year 2014).

S. Kulkami, A.M. Sankpal, R.R. Mudholkar and Kirankumari, "Recommendation engine: Matching individual/group profiles for better shopping experience," 2013 15th International Conference on Advanced Computing Technologies (ICACT), Rajampet, 2013, pp. 1-6. (Year: 2013).

T.Y. Lee, S. Li and R. Wei, "Needs-Centric Searching and Ranking Based on Customer Reviews," 2008 10th IEEE Conference on E-Commerce Technology and the Fifth IEEE Conference on Enterprise Computing, E-Commerce and E-Services, Washington, DC, 2008, pp. 128-135. (Year: 2008).

Levy, Michael, and Dhruv Grewal. "Supply chain management in a networked economy." Journal Retailing 76.4 (2000): 415-429.

Neisser, "Which is better for Social Media Monitoring: TweetDeck or SproutSocial" Mar. 17, 2011, Social Media Examiner, https://www.socialmediaexaminer.com/which-is-better-for-social-media-monitoring-tweetdeck-or-sproutsocial/.

Ross, David Frederick, Frederick S. Weston, and W. Stephen. Introduction to supply chain management technologies. CRC Press, 2010.

\* cited by examiner

SYSTEM AND METHOD FOR OPTIMIZING ONLINE MARKETING BASED UPON RELATIVE ADVERTISEMENT PLACEMENT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Present Disclosure

The present disclosure relates generally to electronic commerce ("e-commerce"), and more particularly, but not necessarily entirely, to systems and methods for optimizing online content displayed on webpages, including advertisements and search results listings.

2. Description of Related Art

Business conducted over the Internet, generally referred to as e-commerce, has grown dramatically with the proliferation of consumer electronic devices. Typically, online businesses conduct e-commerce with users through e-commerce websites made available on the Internet. To increase web traffic, online businesses often optimize their e-commerce websites to increase their rankings in online search results generated by search engines. These type of searches performed by search engines are often referred to as "natural" search results. The process of increasing one's ranking in natural search results is commonly referred to as search engine optimization (SEO).

In addition, online businesses can increase traffic to their e-commerce websites by paying an advertising fee to a search engine operator for top placement in "paid" search results. Usually, an online business can increase the ranking of its e-commerce website in paid search results by paying a higher advertising fee or bid to the search engine operator. Popular search engines includes Google, Bing, and Yahoo. Search engines often display a mix of both natural search results and paid search results on a single search result webpage. Most search engines make it easy for online users to distinguish between natural search results and paid search results displayed on the same webpage.

While high search rankings do not guarantee success, they are a key metric that many online businesses use as a way to measure market exposure. In the past, even a drop of a few ranks in the search results may result in a significant decrease in web traffic. Thus, many online businesses continuously conduct SEO audits to obtain a benchmark of paid and natural search results rankings for critical keywords.

Actual search engine rankings, however, may be difficult to determine for various reasons. First, search engine algorithms are increasingly providing personalized search results-meaning that two different users using the same keywords in an online search may see different search results. Second, search engine algorithms are increasingly taking into account the physical locations of users to provide local listings. To address these problems, SEO audits may determine search results rankings by averaging the results of multiple searches conducted by proxy computers positioned at various geographic locations. In this manner, online businesses may obtain an average benchmark of their website rankings in search results.

Increasingly, however, online businesses have observed that search engine rankings are becoming less relevant in driving web traffic to their websites. This phenomenon primarily stems from the fact that search engine operators have become more proactive in providing new variations to the traditional search results templates utilized to present search results to users. These new search results templates simply do not guarantee a prominent placement on the search results webpage even for websites that have the top rankings in the natural search results and/or the paid search results. For example, while the highest ranked search results may be on the first page of the search results, they may be displayed below the user's initial view area such that the user must scroll down to see them.

Thus, while search results rankings likely will remain an important metric for determining online marketing exposure, improved metrics are needed to optimize search results and advertisement placement. It would therefore be an improvement of the art to provide improved metrics for optimizing online exposure. It would be a further improvement to provide improved metrics for optimizing the placement of advertisements, e.g., banner ads, on webpages.

The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
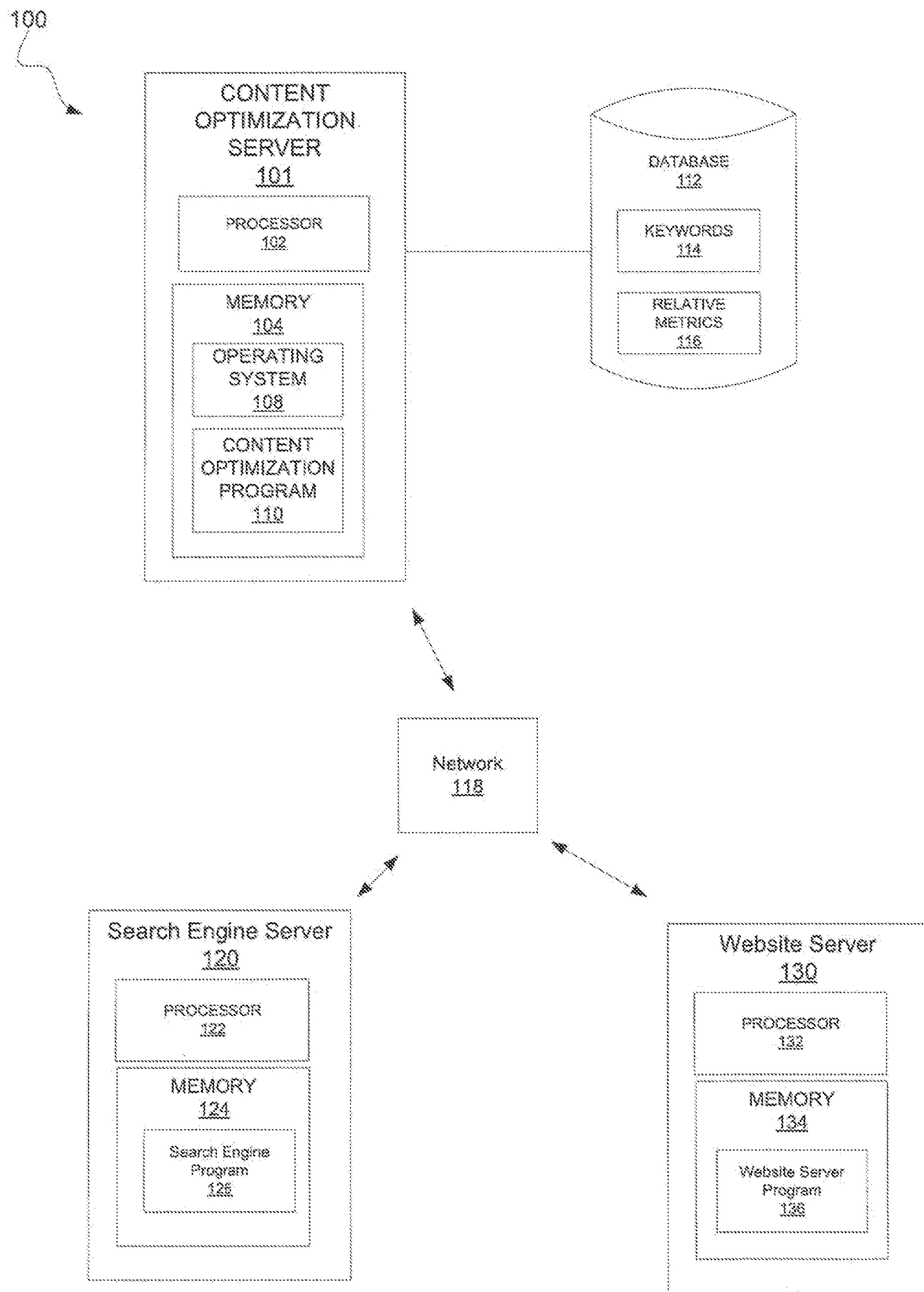
FIG. 1 is a block diagram of an advertising optimization system according to an embodiment of the present disclosure.

For the purposes of promoting an understanding of the principles in accordance with the disclosure, reference will now be made to the embodiments illustrated in the drawings and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used in this specification and the appended claims, the terms "comprising," "including," "containing," "having," "characterized by," and grammatical equivalents thereof are inclusive or open-ended terms that do not exclude additional, unrecited elements or method steps.

Various illustrative embodiments of the present invention, for example, advantageously provide systems, computer-readable media, programs, and methods for optimizing online marketing based on the relative sizes of selected online content, referred to herein as "target content." In an illustrative embodiment, the present invention determines the size of target content by using HTML tags specifying where the target content starts and ends on search results webpages. In an illustrative embodiment, the present invention determines the sizes of the target content based on the sizes of the boxes defined by the source code for the target content. In an illustrative embodiment, the present invention also determines the sizes of the search results pages based on the source code of the search results pages. The relative size of the target content may be based on the size of the target content and the size of the search results pages. For example, in an illustrative embodiment, the present invention may determine the relative size of the target content by dividing the size of the target content by the size of the search results page. In an illustrative embodiment, the present invention may express the relative size of the target content by a numerical value, such as a percentage or some other value.

Various illustrative embodiments of the present invention, for example, advantageously provide systems, computer-readable media, programs, and methods for optimizing online marketing based on the relative position of target content on a webpage. For example, the present invention may determine the relative position of listings in search results generated by a search engine server by determining the distances of the listings from a predetermined location on the search result webpage.

Systems, computer-readable media, programs, and methods of the present invention may determine a distance of the listings relative to the display pixel located at the (1,1) pixel coordinate of the search results webpage. It will be appreciated, however, that the relative position of the listings in the search results may be determined relative to any location on the webpage.

Based either partially or wholly on the relative size and placement information, the systems, computer-readable media, programs, and methods of the present invention may further determine if the target listings on the search results are optimal on the search results webpages. In an illustrative embodiment, the present invention determines if the target listings in the search results are within the users' initial view area of the search results webpage as shown on the displays of the users' computers. In an illustrative embodiment, the present invention may determine if the target listings in the search results are out of the users' initial view area of the search results webpage on the displays of the users' computer.

The systems, computer-readable media, programs, and methods of the present invention may further optimize online content by recommending increasing or decreasing advertising expenditures. In an illustrative embodiment, the present invention may recommend increasing spending on paid search results if the relative size or placement of target listings in the search results generated by a search engine is undesirable. This may be true even where the target listings are highly ranked in the search results. In an embodiment, the present invention may recommend decreasing spending on paid search results if the relative size or placement of target listings in the search results generated by a search engine is desirable.

The systems, computer-readable media, programs, and methods of the present invention may further be utilized to optimize online advertisements, such as banner ads, on webpages. In an illustrative embodiment, the present invention determines the sizes of target advertisements by using the source coding for the webpages, which specifies where the target advertisements start and end on the webpages.

In an illustrative embodiment, the present invention determines the sizes of the target advertisements based on the sizes of the boxes defined by HTML tags in the source coding. In an illustrative embodiment, the present invention determines the sizes of the webpages based on the source code of the webpages. The relative sizes of the target advertisements are based on the size of the target advertisements and the size of the webpages. For example, in an illustrative embodiment, the present invention may determine the relative size of a target advertisements by dividing the size of the target advertisement by the size of the webpage. In an embodiment, the present invention may express the relative sizes of target advertisements by a numerical value, such as a percentage or some other value.

Various illustrative embodiments of the present invention, for example, advantageously provide systems, computer-readable media, programs, and methods for optimizing online marketing based upon the relative placement of target advertisements on webpages. In an illustrative embodiment, the present invention may determine the relative placement of target advertisements on webpages by determining the distances of the target advertisements from a predetermined location on the webpage. For example, systems, computer-readable media, programs and methods of the present invention may determine a distance of target advertisements relative to a display coordinate located at (1,1). It will be appreciated, however, that the relative placement of the target advertisements may be determined relative to any display coordinate (x,y) on a webpage.

Various illustrative embodiments of the present invention, for example, advantageously provide systems, computer-readable media, programs, and methods for determining an advertising rate based on the relative size or relative placement of target content on a webpage. In an illustrative embodiment, the target content is one of a listing in paid search results and a banner-type advertisement on a webpage. In particular, the systems, computer-readable media, programs, and methods of the present invention may determine advertising rates for target content based on a distance relative to a predetermined location on the webpages.

In an illustrative embodiment, systems, computer-readable media, programs, and methods of the present invention may determine advertising rates based on the relative sizes of the online advertisements compared to the webpages or a portion of the webpages.

Various illustrative embodiments of the present invention, for example, advantageously provide systems, computer-readable media, programs, and methods for allowing online advertisers to place bids for advertising based on the relative size or relative placement of advertising, such as banner ads or paid search results, on a webpage. For example, in an illustrative embodiment, the advertisement for the online advertiser with the highest bid for a keyword may be given optimal placement relative to a predetermined position on a webpage. In another illustrative embodiment, the advertisement for the online advertiser with the highest bid for a keyword may be allocated the largest relative size on a webpage.

Referring now to FIG. 1, there is depicted a block diagram of an exemplary optimization system 100 according to an illustrative embodiment of the present disclosure. The system 100 may include a server 101 having a processor 102 coupled to a memory 104. It will be appreciated that the processor 102 may comprise multiple processors.

Loaded in the memory 104 are programs containing computer-readable instructions that are executable by the processor 102. The programs include an operating system 108 as is known to those having skill in the art. In addition, the programs further include a content optimization program 110. The program 110 comprises computer-readable instructions that, when executed by the processor 102, cause the processor 102 to carry out the functionality and features of the system 100 described herein. As known to those of ordinary skill, a user may enter commands and information into the server 101 through input devices such as a keyboard and a pointing device, such as a mouse (not shown).

In an illustrative embodiment, the server 101 comprises a collection of computer servers, each having its own processor or processors that are connected to an internal, or external, network in what is commonly referred to as a "server farm," with each server performing unique tasks or the group of servers sharing the load of multiple tasks. Each server of a server farm includes a processor coupled to a memory. The server farm is scalable as is known to those skilled in the art to accommodate large demand on the server 101.

In an illustrative embodiment, the server 101 may be part of an e-commerce enterprise for selling products over the Internet. The e-commerce enterprise may include an e-commerce server (not shown) that provides an e-commerce website on the Internet. Associated with the e-commerce enterprise are keywords that are utilized by the enterprise to drive traffic to the e-commerce website. For example, the keywords may be utilized by users to form keyword searches on an Internet search website.

In an illustrative embodiment, the system 100 further includes a database 112 residing on an electronic storage medium. Stored in the database 112 are those keywords 114 of importance to an e-commerce enterprise. In particular, the keywords 114 stored in the database 112 may be those words or phrases that a user types into a search interface of a search engine website to find the e-commerce website hosted by the e-commerce enterprise, as is known to those of ordinary skill in the art. For example, the keywords may comprise keywords utilized in paid search marketing.

In an illustrative embodiment, the server 101 may be independent of an e-commerce enterprise. That is, the server 101 may provide its services to multiple third-parties over the Internet. For example, the operators of the server 101 may charge a fee to third-parties for accessing the optimization features provided by the server 101.

In an illustrative embodiment, the system 100 may include a computer network 118, such as the Internet. The computer server 101 is connected to the computer network 118 in a manner known to those having ordinary skill in the art. The system 100 may also include a search engine server 120 connected to the network 118. The server 101 may be able to access the features of the search engine server 120 over the network 118. In particular, the search engine server 120 may include a processor 122 and a memory 124. Stored in the memory 124 may be a search engine program 126. The search engine program 126 may be operable to generate a search engine interface webpage as is known to those having ordinary skill in the art. The search engine interface webpage may include a search box that allows users to define a keyword search query from remote user computers (not shown).

In response to the keyword search query entered by the user, the search engine program 126 may return a search results webpage that is displayed on the users' remote computers, as is known to those having ordinary skill in the art and not described in detail herein. Popular search engine servers include Google, Yahoo, Dogpile, and Bing.

The search engine server 120 may return search results in accordance with one or more templates created by the operator of the search engine server 120. The templates may include paid search results and natural search results. It will be appreciated that the system 100 may include a plurality of search engine servers, each operated by a different search engine operator.

As mentioned, the search engine server 120 may generate a search results webpage in response to a search query. More particularly, the search engine server 120 may generate HTML source code that defines the search results webpage. The source code may be generated by the search engine server 120 according to a template. A web browser running on a user's computer renders the search results page on the user's display from the source code. Blocks of source code may define each of the listings in paid search results and listings in natural search results. In particular, the blocks of source code may define the size, position, and content of each of the listings. Each of the blocks of source code may further include a specific uniform resource locator ("URL"), also known as a link or web address, which is displayed in the listing. A user may select the URL by clicking on the URL, which causes the user's web browser to be directed to the webpage indicated by the URL. The source code may further define other content for display on the search results webpage, including graphics, images, text boxes, and other content.

The system 100 may also include a website server 130 connected to the network 118. The server 101 may be able to access the features of the web site server 130 over the network 118. In particular, the web site server 130 may include a processor 132 and a memory 134. Stored in the memory 134 may be a web server program 136. The web server program 136 may be operable to generate webpages as is known to those having ordinary skill. The webpages generated by the web site server 130 may include a wide variety of content of interest to users. For example, the webpages may include social network content, news content, or any other content.

Disposed on the webpages generated by the web site server 130 may be advertisements in various forms, including banner ads. More particularly, the web site server 130 may generate HTML source code that defines webpages for display in a users' web browsers. The source code may be generated by the web site server 130 according to a template.

Blocks of source code may define content that is to be displayed on the users' web browsers. In addition, the blocks of source code may define the advertisements, including the content, position, and size of the advertisements. Each of the blocks of source code may further include a specific uniform resource locator ("URL"), also known as a link or web address, which is displayed in association with the advertisements. A user may select the URL by clicking on the advertisements, which causes the user's web browser to be directed to the webpage indicated by the URL.

It will be appreciated that as used herein, the term "target content" refers to content of interest that is displayable on a webpage. Target content may include, without limitation, listings in paid search results, listings in natural search results, and online advertisements, such as banner ads and the like. It will further be appreciated that "target source code" is a block of code in the webpage source code. The target source code is rendered by a web browser to display the target content on a user's display.

Figure 2:
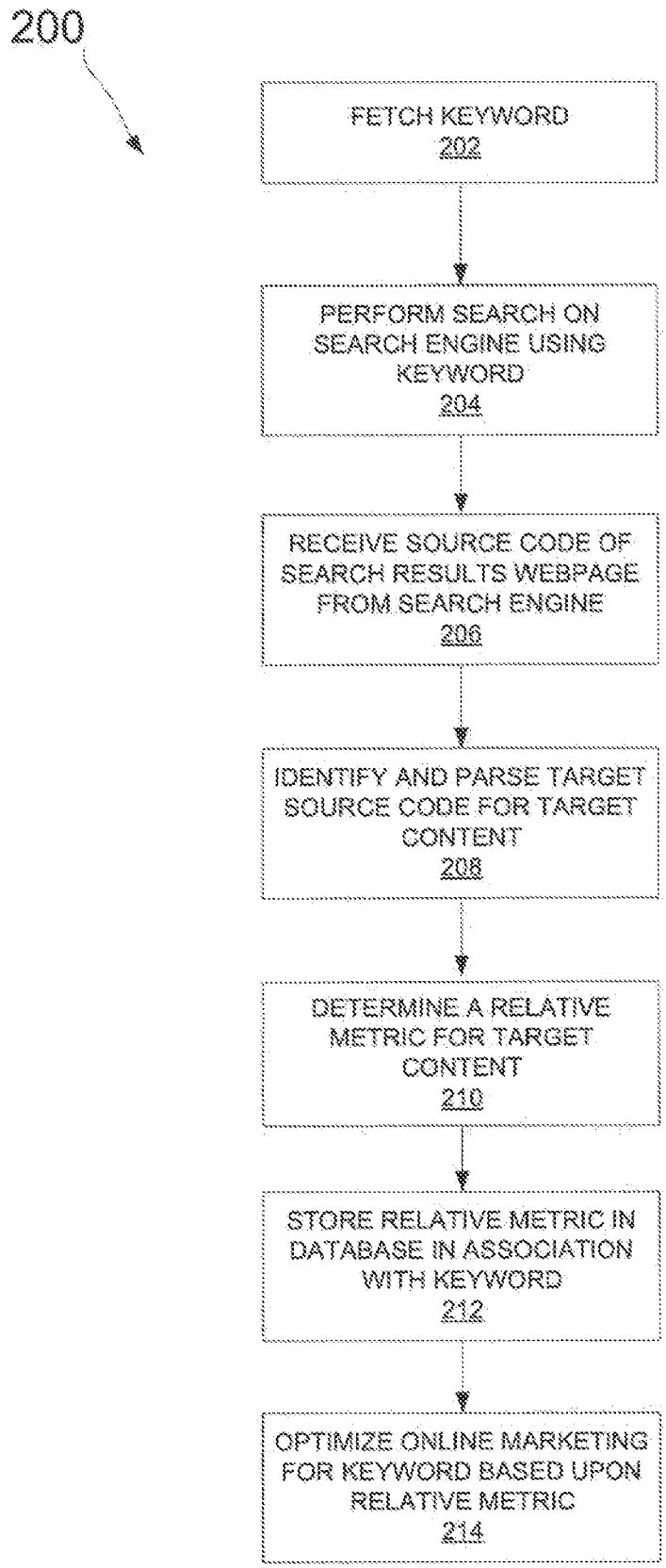
FIG. 2 is a flow diagram of a process for optimizing online marketing by determining a relative metric for target content on a search results webpage generated by a search engine.

Referring now to FIG. 2, there is a flow chart according to a process 200 performed by the system 100, and in particular, the processor 102 of the server 101 shown in FIG. 1. In particular, the processor 102 may execute the computer-readable instructions of the program 110 stored in the memory 104 of the server 101 to accomplish the steps shown in the flowchart depicted for the process 200.

At step 202, server 101 may automatically fetch one or more keywords from the database 112. In an illustrative embodiment, the one or more keywords may be manually entered into the server 101 by a user. Typically, the keywords are those keywords utilized by e-commerce operations to drive traffic to their associated websites. At step 204, the server 101 forms a search query on a search request interface generated by the search engine server 120. In this regard, the server 101 may automatically access the search engine request interface at a pre-designated URL. The server 101 then automatically populates the search box with one or more of the keywords and then causes the search to be performed by the search engine server 120. It will be appreciated that, as used herein, a "keyword" may include a keyword phrase comprising multiple words.

At step 206, the server 101 receives the source coding for the target webpage, which is a search results webpage generated by the search engine server 120. The search results webpage may comprise search results responsive to the search request defined by the keyword. In an illustrative embodiment, the source coding for the search results webpage may comprise blocks of source code that define the listings in the paid search results and natural search results. The source code for the search results webpage may further define additional content for display on a user's computer as determined by the designated search results template utilized by the search engine server 120. The additional content may include graphics, images, webpage features, and advertisements.

At step 208, the server 101 identifies blocks of target source code in the source coding of the search results webpage. In particular, the target source code may define target content, e.g., target listings, that occurs in the paid search results and the natural search results. Typically, but not necessarily, the identification of the target source coding includes matching text in the source coding to a predetermined word, phrase, URL, or text string.

In an illustrative embodiment, the content matching performed by the server 101 may include matching content in the source coding to a URL of an e-commerce website. For example, the URL may be a web address or link to a product webpage of a website hosted by an e-commerce server. When the server 101 finds a match in the source coding, the server 101 may parse a block of source coding, i.e., the target source code, from the source coding of the search results webpage. That is, the server 101 may extract the target source code for further processing. In an illustrative embodiment, the parsed target source code may include some, or all, of the source coding that defines the targeted content.

At step 210, the server 101 generates a relative metric for the target content with respect to a layout the search results webpage. In an illustrative embodiment, the relative metric is the relative display size of the target content with respect to search results webpage. In particular, using the information in the target source code, the server 101 determines a size of the target content on the search results webpage. For example, the server 101 may determine the height and width of the target content in pixels and then determines the area (height×width) of the target content on the search results webpage.

Then, from the source coding, the server 101 determines the display size of the entire search results webpage. For example, the server 101 may determine the height and width of the entire search results webpage and then determine its area (height×width). The server 101 then uses the size of the target content and the size of the search results webpage to calculate a relative metric. In an illustrative embodiment, the server 101 divides the size of the target content by the size of the search results webpage to define a percentage that represents the relative size of the target content with respect to the search results webpage.

In an illustrative embodiment, the server 101 may determine the relative metric based on the size of the target content with respect to only a portion of the search results webpage. For example, the portion of the search results webpage may be the portion of the webpage that appears in the initial view area on the display of the user's computer. In this case, the server 101 divides the size of the target content by the size of the initial view area of the search results webpage to define a percentage that represents the relative size of the target content with respect to the initial view area.

It will be appreciated that the initial view area refers to that portion of the search results webpage that is first viewable to a user without scrolling. That is, a search result webpage may be larger than a display area in a web browser. In this case, the web browser may automatically generate a user interactive scroll bar that allows a user to scroll down to view that portion that is not initially viewable.

In the above manner, the server 101 is able to determine a footprint of the target content on either, or both of, the entire search results webpage, or just the portion of the search results webpage that appears in the initial view area.

In an illustrative embodiment, the relative metric determined by the server 101 is defined by a distance of the target content from a predetermined location on the search results page. For example, the server 101 may determine a distance of target conduct from a predetermined location on the search results page. A good choice for the predetermined location is the (1,1) pixel on the search results page, which is located at the top, left corner of the search results webpage in a user's web browser. The distance of the target content may be determined from a pixel of the target content located anywhere in the target content. In an illustrative embodiment, the server 101 determines and stores in the database 112 both the relative size(s) and relative distance of the target content as relative metric data 116 as shown in FIG. 1.

It will be appreciated that the relative metric may be determined by the server 101 using data from a plurality of searches conducted by proxy computers located throughout a geographic region. In an illustrative embodiment, the server 101 averages the relative metrics for each of the searches conducted by the proxy servers to get a clear snapshot of the target content. As mentioned above, the search engine server 120 may provide different search results for the same keyword based on search personalization and geographic location. Thus, averaging the relative metrics across searches performed by multiple proxy computers will provide a more accurate snapshot of the relative metrics for the target content. In an illustrative embodiment, the server 101 may average over 100; 1,000; or 10,000 searches conducted by proxy in order to determine an average of the relative metric. The relative metric determined by the server 101 may be stored in association with the keyword utilized to form the pertinent search query. In addition, the server 101 may store information on the rankings of the target content in the paid or natural search results. Thus, at step 212, the relative metric for the target content is stored in the database 112.

At step 214, the server 101 makes recommendations to optimize online marketing based on the relative metric(s). For example, if the relative metric indicates that the relative size of the footprint of target content is small on the search results webpage, the server 101 may recommend that bids on the relevant keyword for paid search results be increased. Likewise, if the relative metric indicates that the relative size of the footprint of target content is large on the search results page, the server 101 may recommend that the bid on the relevant keyword for paid search results be decreased to prevent overpayment.

If the relative distance between the target content and a predetermined position on the search results webpage is large, the server 101 may recommend that bid on the relevant keyword for paid search results be increased to reduce the distance. Likewise, if the relative distance between the target content and a predetermined position on the search results webpage is small, the server 101 may recommend that bid on the relevant keyword for paid search results be decreased to prevent overpayment.

It will be appreciated that the server 101 may dynamically update the relative metrics for identified keywords according to a set schedule, including hourly, daily, or weekly. It will be appreciated that the server 101 may automatically increase or decrease bids for keywords utilized in paid search results based on the relative metrics determined by the server 101.

Figure 4:
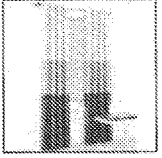
FIG. 4 is an exemplary search results webpage generated by a search engine server.
Figure 5:
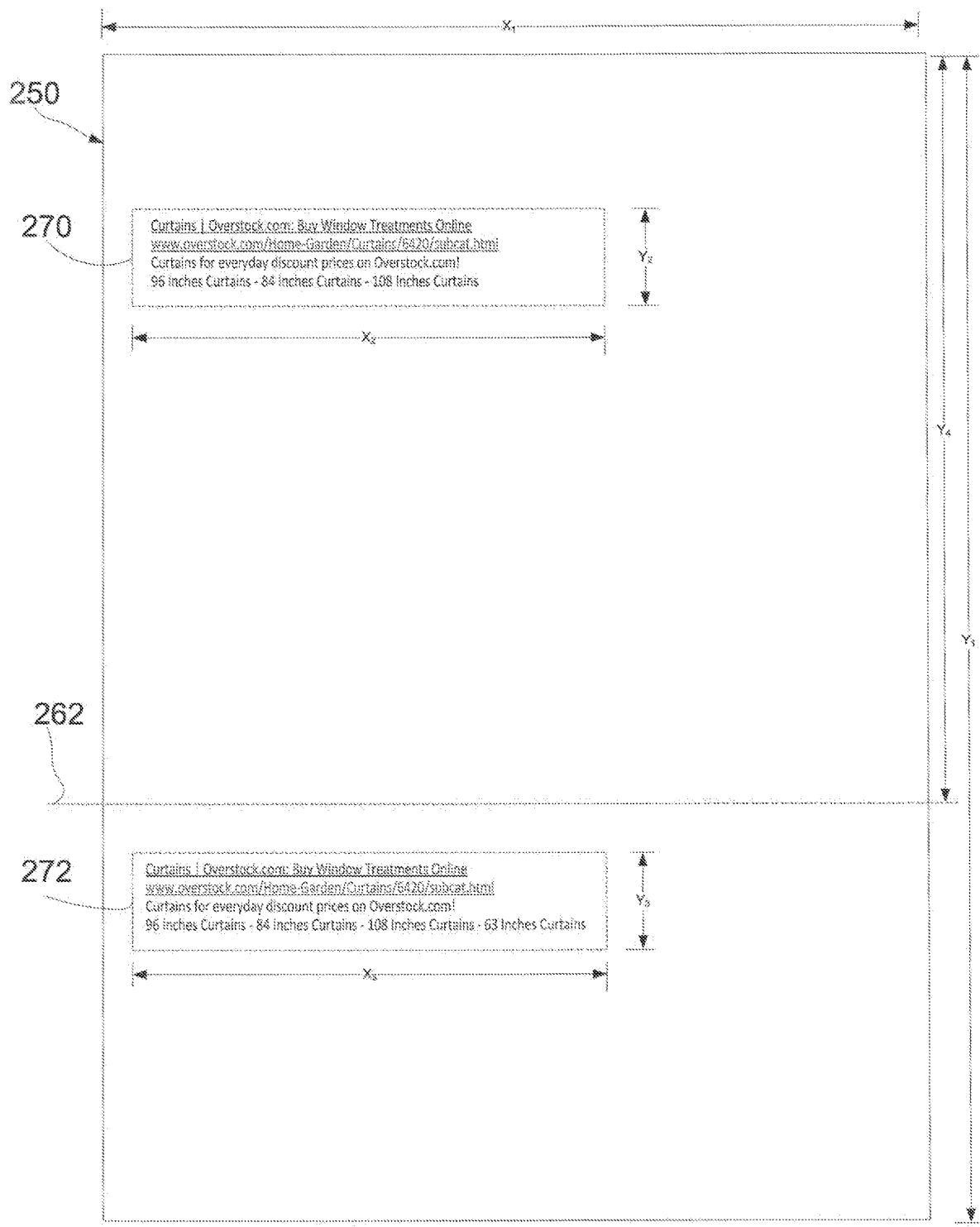
FIG. 5 is the exemplary search results webpage shown in FIG. 4 that indicates the relative size of the target content.
Figure 6:
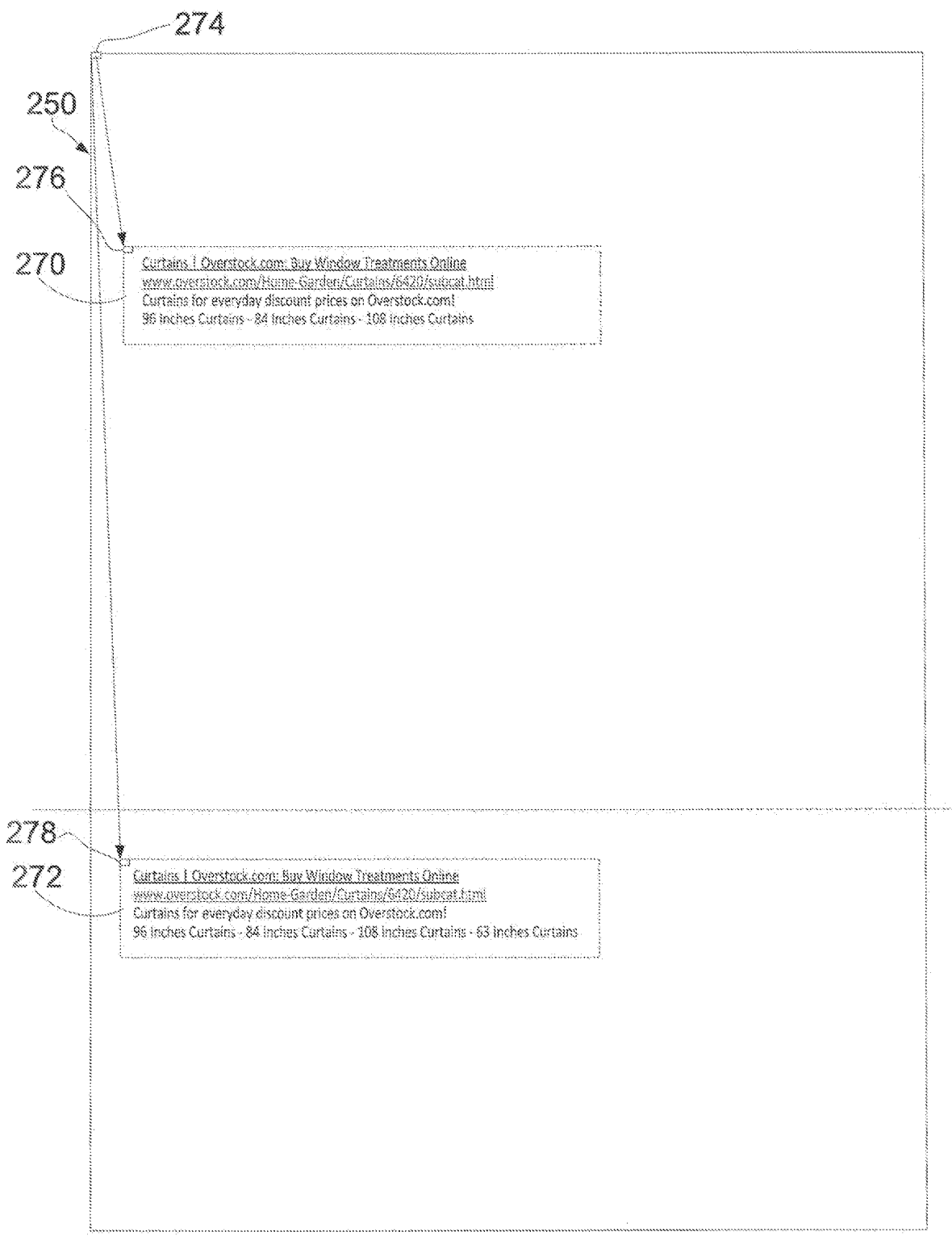
FIG. 6 is the exemplary search results webpage shown in FIG. 4 that indicates the relative position of the target content.

Referring now to FIGS. 4, 5, and 6, there is depicted an example of a process for determining relative metrics for target content on an exemplary search results webpage 250 generated by a search engine server. The process may be performed by the server 101 shown in FIG. 1. By way of background, the search results page 250 includes a search bar 252 that displays the keyword utilized to generate the search results. In this case, the keyword used to generate the search results is "curtains." The search results page 250 may include paid search results 254 directly beneath the search bar 252. Below the paid search results 254 are local listings 256 deemed to be relevant to the keyword by the search engine server. In particular, the local listings 256 may be locations near the user's location that offer curtains for sale.

Located to the right of the paid search results 254 and local listings 256 are images 260 generated by the search engine server in response to the keyword. The images 260 may be selectable by a user to link the user to the webpage that hosts the images. Located below the local listings 256 are the natural search results 258. Because of the size of the webpage 250, the entire webpage may not be displayed on a display of a user's computer at the same time. The dashed line 262 indicates the initial view area of the webpage 250. To see below the dashed line 262, a user must scroll down.

The search results webpage 250 may be generated by a search engine server in response to a keyword search query defined by the server 101. In response to the keyword search query, the search engine server may return the source coding for the webpage 250 to the server 101. It will be appreciated that the server 101 may not actually render the source coding for display in a web browser. Instead, the server 101 may process the source coding to determine relative metrics of target content on the webpage 250.

In this regard, the server 101 may first search the source coding of the webpage 250 to find a match to a predetermined text string. In an illustrative embodiment, the predetermined text string may be a web address. In the case of this example, the text string is www.overstock.com. As can be observed, this text string occurs in a listing in the paid search results and a listing in the natural search results. These listings are referred to herein as "target content."

Once the server 101 finds a match in the source code, the server 101 then parses one or more blocks of source code that defines the target content from the source code. The server 101 then process the blocks of source code to determine the size of the target content on the search results page 250.

As seen in FIG. 5, the target content may include a first listing 270 and a second listing 272. From the parsed block of source code defining the first listing 270, the server 101 determines the size of the first listing 270 to be $X_2$ by $Y_2$ pixels. Likewise, from the parsed block of source code defining the second listing 272, the server 101 determines the size of the second listing 272 to be $X_3$ by $Y_3$ pixels. Using this information, the server 101 then determines the area of the first listing 270 and the second listing 272 by multiplying the dimensions. The server 101 may then determine the size of the webpage 250 from the source coding. In this case, the size of the webpage is $X_1$ by $Y_j$ pixels. The server 101 then determines the area of the webpage 250 by multiplying its dimensions.

The server 101 finds the relative sizes of the first listing 270 and the second listing 272 by dividing their area by the area of the webpage 250. The relative sizes of the listings 270 and 272 may be expressed as a percentage. Additionally, the server 101 may determine the size of the initial view area of the webpage 250 by determining its dimensions from the source coding, in this case, $X_1$ by $Y_4$ pixels. The relative size of the first listing 270 with regard to the initial view area may be determined by dividing the size of the first listing 270 by the size of the initial view area. Using these metrics, the server 101 is able to optimize advertising expenditures as described above.

Referring now to FIG. 6, the server 101 may also determine a relative position of the listings 270 and 272 from a predetermined position on the webpage 250. In this case, the predetermined position is the pixel 274 located at the (1,1) coordinate on the webpage 250. However, it will be appreciated that the predetermined position may be anywhere on the webpage 250. In particular, the distance of the first listing 270 may be determined between the pixel 274 and the pixel 276 and the distance of the second listing 272 may be determined between the pixel 274 and the pixel 278. Using these metrics, the server 101 is able to optimize advertising expenditures as described above.

Figure 3:
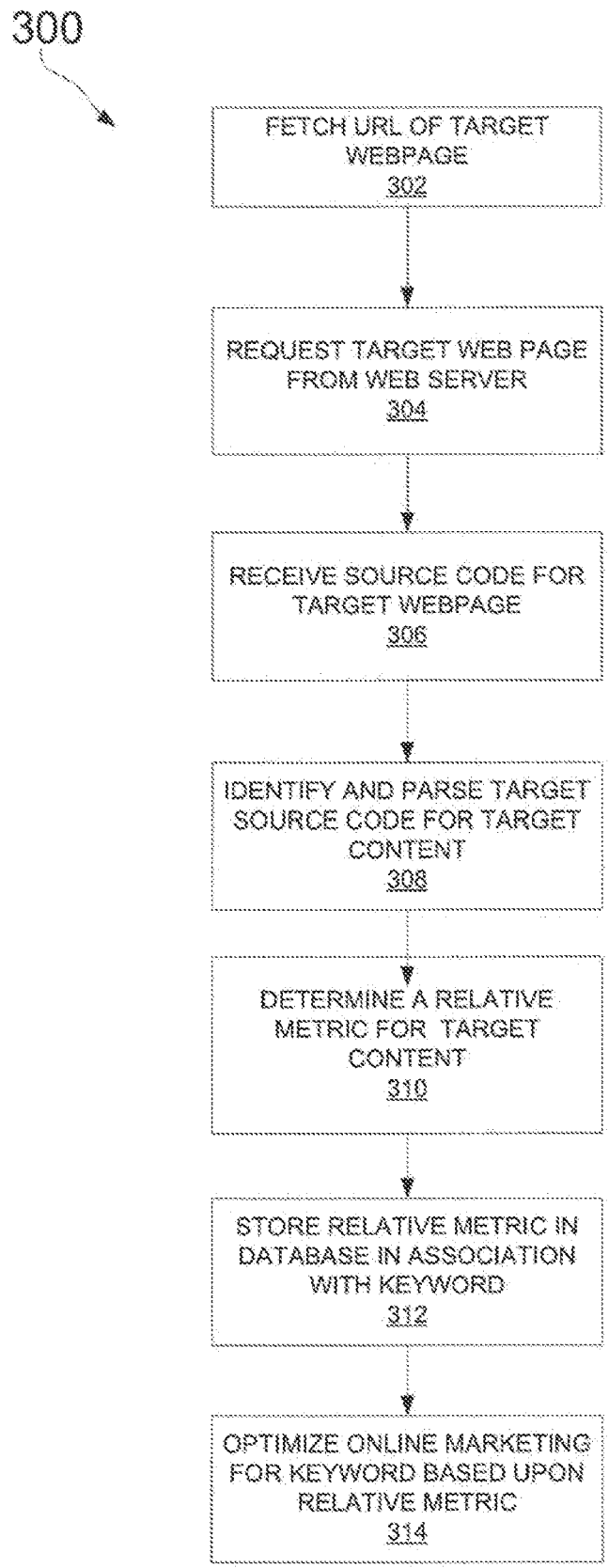
FIG. 3 is a flow diagram of a process for optimizing online marketing by determining a relative metric for target content on a webpage generated by a webpage server.

Referring now to FIG. 3, there is a flow chart according to a process 300 performed by the system 100, and in particular, the processor 102 of the server 101 shown in FIG. 1. In particular, the processor 102 may execute the computer-readable instructions of the program 110 stored in the memory 104 of the server 101 to accomplish the steps shown in the flowchart depicted for the process 300.

At step 302, the server 101 may fetch a URL of a target webpage. In an illustrative embodiment, the target webpage may be hosted by the web server 130. The target webpage may comprise target content in the form of online advertisements of interest. At step 304, the server 101 requests the target webpage from the web server 130. At step 306, the source code for the target webpage as generated by the web server 130 is received at the server 101.

At step 308, the server 101 identifies and parses target source code for target content from the source code for the target webpage. In particular, the server 101 identifies blocks of target source code in the source code of target webpage. The target source code may define target content, e.g., advertisements, that occurs on the target webpage. Typically, but not necessarily, the identification of the target source coding includes matching text in the source coding to a predetermined word, phrase, URL, or text string. In an illustrative embodiment, the content matching performed by the server 101 may include matching text in the source coding to a URL of an e-commerce website. For example, the URL may be a web address or link to a product webpage of a website hosted by an e-commerce server.

When the server 101 finds a match in the source coding, the server 101 parses a block of source coding, i.e., the target source code. That is, the server 101 may extract the target source code for further processing. In an embodiment, the parsed target source code may include some, or all, of the source coding that defines the target content that is displayed on the target webpage.

At step 310, the server 101 generates a relative metric for the target content with respect to a layout of the target webpage. In an illustrative embodiment, the relative metric is the relative display size of the target content with respect to the target webpage. In particular, using the information in the target source code, the server 101 determines a size of the target content on the target webpage. For example, the server 101 may determine the height and width of the target content in pixels and then determines its area (height× width).

Next, from the source coding, the server 101 determines the display size of the entire target webpage. For example, the server 101 may determine the height and width of the entire target webpage and then determine its area (height× width). The server 101 then uses the size of the target content and the size of the target webpage to calculate the relative metric. In an illustrative embodiment, the server 101 divides the size of the target content by the size of the target webpage to define a percentage that represents the relative size of the target content with respect to the target webpage.

In an illustrative embodiment, the server 101 may determine the relative metric based on the size of the target content with respect to only a portion of the target webpage. For example, the portion of the target webpage may be the portion of the target webpage that appears in the initial view area on the display of the user's computer. In this case, the server 101 divides the size of the target content by the size of the initial view area of the target webpage to define a percentage that represents the relative size of the target content with respect to the initial view area. In this manner, the server 101 is able to determine a footprint of the target content on either, or both of, the entire target webpage, or just the portion of the target webpage that appears in the initial view area.

In an illustrative embodiment, the relative metric determined by the server 101 is defined by a distance of the target content from a predetermined location on the target webpage. For example, the server 101 may determine a distance of target conduct from a predetermined pixel location on the target webpage. As explained above, a good choice for the location is the pixel (1,1) on the target webpage. The distance of the target content may be determined from a pixel of the target content located anywhere in the target content.

In an illustrative embodiment, the server 101 determines and stores 312 in the database 112 both the relative size(s) and relative distance of the target content as relative metric data 116 shown in FIG. 1. As above, it will be appreciated that the relative metric may be determined by the server 101 from a plurality of searches conducted by proxy computers located throughout a geographic region.

At step 314, the server 101 makes recommendations to optimize online marketing based upon the relative metric(s). For example, if the relative metric indicates that the relative size of the footprint of target content is small on the target webpage, the server 101 may recommend an increase in advertising expenditure.

Likewise, if the relative metric indicates that the relative size of the footprint of target content is overly large on the target webpage, the server 101 may recommend that advertising expenditures be decreased.

If the relative distance between the target content and a predetermined position on the search results webpage is large, the server 101 may recommend an increase in advertising expenditures to reduce the distance. Likewise, if the relative distance between the target content and a predetermined position on the target webpage is small, the server 101 may recommend a decrease in advertising expenditures to prevent overpayment. It will be appreciated that the server 101 may dynamically update the relative metrics for identified keywords according to a set schedule, including hourly, daily, or weekly. It will be appreciated that the server 101 may automatically increase or decrease advertising expenditures based on the relative metrics.

In an illustrative embodiment, relative metric information, such as relative size and relative position, may be utilized to determine advertising rates. For example, a higher bid for a keyword may result in a larger relative size or improved relative position on a search results webpage. In another example, a higher fee for paid advertising may result in a larger relative size or preferred placement on a webpage. Stated another way, using the relative metrics discussed herein, advertisements with a larger footprint on a webpage are charged higher rates than advertisements with a smaller footprint on a webpage. The relative metrics discussed herein may be utilized in SEO for keywords. In an embodiment, the relative metrics may be utilized to change a relative position of target content on a webpage. For example, SEO may occur depending on whether the relative metric is below or above a predetermined value. That is, the server 101 may compare a relative metric for target content to a predetermined value, or range, and recommend increasing or decreasing a keyword bid in order to change the relative position of the target content on a search results webpage generated by a search engine server. In an embodiment, the server 101 may repeat the process in iteration to obtain a desired relative metric.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A method for optimizing advertising on a webpage, said method comprising:
   receiving source code from each of a plurality of proxy computers located throughout a geographic region each defining the webpage from a web server at a content optimization server, the content optimization server having a collection of computer servers, each having its own processor, connected to a network to act as a server farm;
   processing the source code from each of the plurality of proxy computers located throughout a geographic region with the processor of the content optimization server to identify target source code for each of the plurality of proxy computers in the source code from each of the plurality of proxy computers located throughout the geographic region, wherein the content optimization server identifies blocks of target source code by matching text in the source code to predetermined code in the server;
   extracting the target source code using the content optimization server wherein the target source code includes at least some of the source coding that defines target content displayed on the target webpage;
   processing the target source code with the processor of the content optimization server to determine a relative metric for the target content with respect to a layout of the webpage, wherein processing the target source code comprises:
   determining a size of the target content on the webpage by using HTML tags specifying where target content starts and ends on a search results webpage;
   determining a size of the webpage by using the source code of the search results page;
   determining the proportion of the size of the target content to the size of the webpage;
   determining the location of target content on the webpage by determining the distance of the target content from a predetermined location on the search results page;
   determining whether the target content is visible to the user when first seeing the webpage determining the size of the visible target content relative to the size of the initially visible area of a webpage;
   generating the relative metric for the target content, wherein the relative metric is based on the size of the target content with respect to the size of the webpage, the location of the target content on the webpage, whether the target content is visible to the user when first seeing the webpage, and the size of the target content visible to the user relative to the size of the initially visible part of the webpage for each of the plurality of proxy computers located throughout the geographic region;
   dynamically updating the relative metric according to a selected schedule;
   storing the relative metric in a database;
   automatically generating a bid amount for the target content to be displayed on the webpage according to the relative metric;
   automatically changing the bid amount based on the dynamic updating of the relative metric; and
   recommending a change in expenditure for the target content based on the bid amount.

2. The method of claim 1, wherein the webpage is a search results webpage generated by a search engine server.

3. The method of claim 1, wherein the target content comprises a link to a product webpage of an e-commerce website.

4. The method of claim 1, wherein processing the source code comprises matching content in the source code to a predetermined text string.

5. The method of claim 4, wherein the predetermined text string is a web address.

6. The method of claim 1, wherein the relative metric is determined by dividing the size of the target content by the size of the webpage.

7. The method of claim 1, wherein processing the target source code comprises determining a distance of the target content from a predetermined position on the webpage.

8. The method of claim 7, wherein the predetermined position is a pixel on the webpage.

9. The method of claim 1, wherein the relative metric is a percentage value.

10. The method of claim 1, further comprising:
    fetching a keyword from a database;
    forming a search query using the keyword on a search request webpage generated by a search engine server; and
    causing the search engine server to perform a search using the keyword;
    wherein the webpage is a search results webpage containing the search results for the keyword.

11. The method of claim 1, wherein the target content is a listing in paid search results.

12. The method of claim 1, wherein the target content is a listing in natural search results.

13. The method of claim 1, wherein the target content is a banner advertisement on the webpage.

14. The method of claim 1, further comprising adjusting an advertising expenditure for online advertising based on the relative metric.

15. A system for creating advertisements on a webpage, said system comprising:
    a server having a collection of computer servers, each having its own processor, connected to a network to act as a server farm;
    a memory coupled to the server; and computer-readable instructions stored in the memory that, when executed by the server, cause the server to:

(i) receive source code defining the webpage from a web server from each of a plurality of proxy computers located throughout a geographic region, (ii) identify a target source code block in the source code for each of the plurality of proxy computers, by matching text in the source code to predetermined code in the server, the target source code block defining, at least partially, target content on the webpage, (iii) determine a relative metric for the target content with respect to a layout of the webpage, wherein the relative metric is based on:
a size of the target content with respect to a size of the webpage, determined by finding the size of the target content by using HTML tags specifying where target content starts and ends on a search results webpage and comparing that size to that of the target webpage, determined by using the source code,
the location of the target content on the webpage, determined by the distance of the target content from a predetermined location on the search results page,
whether the target content is visible to the user when first seeing the webpage, and
size of the initially visible target content relative to the size of the initially visible area of a webpage, determined using the source code;
each of these determined for each of the plurality of proxy computers located throughout the geographic region, (iv) dynamically update the relative metric according to a selected schedule;

(v) store the relative metric in a database, (vi) automatically generate a bid amount for the target content to be displayed on the webpage according to the relative metric, (vii) automatically changing the bid amount based on the dynamic updating of the relative metric, and (viii) recommend a change in expenditure for the target content based on the bid amount.

16. The system of claim 15, wherein the webpage is a search results webpage generated by a search engine server.

17. The system of claim 15, wherein the source code is HTML source code.

18. The system of claim 15, wherein the computer-readable instructions are further operable, when executed by the processor, to cause the processor to match content in the source code to a predetermined text string.

19. The system of claim 18, wherein the predetermined text string is a web address.

20. The system of claim 15, wherein the computer-readable instructions are further operable, when executed by the processor, to cause the processor to determine a distance of the target content from a predetermined position on the webpage.

21. The system of claim 20, wherein the predetermined position is a pixel on the webpage.

22. The system of claim 15, wherein the relative metric determined by the processor is a percentage value.

23. The system of claim 15, wherein the computer-readable instructions are further operable, when executed by the processor, to cause the processor to:
fetch a keyword from a database;
form a search query using the keyword on a search request webpage generated by a search engine server; and
cause the search engine server to perform a search using the keyword;
wherein the webpage is a search results webpage containing the search results for the keyword.

24. The system of claim 15, wherein the target content is a listing in paid search results.

25. The system of claim 15, wherein the target content is a listing in natural search results.

26. The system of claim 15, wherein the target content is a banner advertisement on the webpage.

27. The system of claim 15, wherein the computer-readable instructions are further operable, when executed by the processor, to cause the processor to adjust an advertising expenditure for online advertising based on the relative metric.

28. A method for creating advertisements on a search results webpage, said method comprising:
providing a server having a collection of computer servers, each having its own processor, connected to a network to act as a server farm;
receiving source code defining the search results webpage from a search engine server for each of a plurality of proxy computers located throughout a geographic region;
processing the source code, using the server, to identify target source code in the source code by matching text in the source code to predetermined code in the server, the target source code defining, at least partially, a search result on the search results webpage for each of the plurality of proxy computers located throughout the geographic region;
processing the target source code, using the server, to determine a relative metric for the search result with respect to a layout of the search results webpage, wherein processing the target source code comprises:
determining a size of the target content on the webpage by using HTML tags specifying where target content starts and ends on a search results webpage;
determining a size of the webpage by using the source code of the search results page;
determining the proportion of the size of the target content to the size of the webpage;
determining a location of the target content on the webpage by determining the distance of the target content from a predetermined location on the search results page;
determining whether the target content is visible to the user when first seeing the webpage; and
determining the size of the visible target content relative to the size of the initially visible area of a webpage;
each being done, for each of the plurality of proxy computers located throughout the geographic region;
generating the relative metric for the target content, wherein the relative metric is based on the size of the target content with respect to the size of the webpage, the location of the target content on the webpage, and whether the target content is visible to the user when first seeing the webpage for each of the plurality of proxy computers located throughout the geographic region;
dynamically updating the relative metric according to a selected schedule, using the server;
storing the relative metric in a database;
automatically generating a bid amount for the target content to be displayed on the webpage according to the relative metric;
automatically changing the bid amount based on the dynamic updating of the relative metric, using the server; and recommending a change in expenditure for the target content based on the bid amount.

29. The method of claim 28, wherein the search result is one of a paid search result and a natural search result.

30. The method of claim 28, wherein the source code is HTML source code.

31. The method of claim 28, wherein processing the source code comprises matching content in the source code to a predetermined text string.

32. The method of claim 31, wherein the predetermined text string is a web address.

33. The method of claim 28, wherein processing the target source code comprises determining a distance of the search result from a predetermined position on the search result webpage.

34. The method of claim 33, wherein the predetermined position is a pixel on the webpage.

35. The method of claim 28, wherein the relative metric is a percentage value.

36. The method of claim 28, further comprising:
fetching a keyword from a database;
forming a search query using the keyword on a search request webpage generated by the search engine server; and
causing the search engine server to perform a search using the keyword.

37. The method of claim 36, further comprising optimizing a bid on the keyword to change a relative position of the search result on the search results webpage for the keyword.

38. The method of claim 37, further comprising repeatedly changing the bid on the keyword and re-determining the relative metric after each change until the relative metric equals a predetermined value or falls within a predetermined range.

* * * * *